United States Patent

Ichiyama

[11] Patent Number: 6,066,903
[45] Date of Patent: May 23, 2000

[54] HYDRODYNAMIC BEARING FOR USE IN AN ELECTRIC MOTOR AND AN ELECTRIC MOTOR HAVING THE HYDRODYNAMIC BEARING

[75] Inventor: Yoshikazu Ichiyama, Kyoto, Japan

[73] Assignee: Nidec Corporation, Kyoto, Japan

[21] Appl. No.: 09/267,621

[22] Filed: Mar. 15, 1999

[30] Foreign Application Priority Data

Mar. 16, 1998 [JP] Japan ................................. 10-087908

[51] Int. Cl.$^7$ ............................. H02K 5/16; F16C 32/06; F16C 1/24

[52] U.S. Cl. ........................... 310/90; 384/107; 384/375; 384/120

[58] Field of Search ................................ 310/90; 57/133; 384/93, 107, 133, 193, 226, 227, 228, 234, 238, 241, 271, 272, 290, 291, 375, 376, 381, 95, 263, 378, 100, 111, 112, 113, 115, 118, 120

[56] References Cited

U.S. PATENT DOCUMENTS

| | | | |
|---|---|---|---|
| 3,639,791 | 2/1972 | Jenkin | 310/90 |
| 3,763,534 | 10/1973 | Conroy et al. | 29/898.069 |
| 3,793,543 | 2/1974 | Stokke et al. | 310/90 |
| 4,694,213 | 9/1987 | Gowda et al. | 310/90 |
| 4,726,693 | 2/1988 | Anderson et al. | 384/114 |
| 4,883,367 | 11/1989 | Maruyama | 384/114 |
| 5,396,134 | 3/1995 | Mochizuki | 310/67 R |
| 5,433,529 | 7/1995 | Hensel | 384/112 |
| 5,504,637 | 4/1996 | Asada et al. | 360/98.07 |
| 5,516,212 | 5/1996 | Titcomb | 384/107 |
| 5,524,986 | 6/1996 | Leuthold et al. | 384/119 |
| 5,658,080 | 8/1997 | Ichiyama | 384/112 |
| 5,707,154 | 1/1998 | Ichiyama | 384/107 |
| 5,715,116 | 2/1998 | Moritan et al. | 360/99.08 |
| 5,765,952 | 6/1998 | Dekker et al. | 384/132 |
| 5,770,906 | 6/1998 | Hazelton et al. | 310/90 |
| 5,791,785 | 8/1998 | Nose et al. | 384/119 |
| 5,806,987 | 9/1998 | Nose et al. | 384/100 |
| 5,839,833 | 11/1998 | Zang | 384/107 |
| 5,847,479 | 12/1998 | Wang et al. | 310/90 |

FOREIGN PATENT DOCUMENTS

| | | |
|---|---|---|
| 8159162 | 6/1996 | Japan . |
| 9180362 | 7/1997 | Japan . |
| 9217736 | 8/1997 | Japan . |
| 9229053 | 9/1997 | Japan . |
| 9291932 | 11/1997 | Japan . |
| 9331652 | 12/1997 | Japan . |

*Primary Examiner*—Nestor Ramirez
*Assistant Examiner*—Dang Dinh Le
*Attorney, Agent, or Firm*—Shinjyu An Intellectual Property Firm

[57] ABSTRACT

A spindle motor includes a stationary shaft and a rotor. A thrust bearing, a first radial bearing and a second radial bearing are defined between the shaft and rotor. A first annular air gap is established between the thrust bearing and the first radial bearing. A second annular air gap is established between the first radial bearing and the second radial bearing. The first annular air gap is able to vent to outside of the spindle motor via a breathing bore formed in a thrust plate of a stationary shaft. The second annular air gap is able to vent to outside the spindle motor only while the rotor is rotating about the shaft.

34 Claims, 5 Drawing Sheets

Fig.1

PRIOR ART

HYDRODYNAMIC BEARING FOR USE IN AN ELECTRIC MOTOR AND AN ELECTRIC MOTOR HAVING THE HYDRODYNAMIC BEARING

BACKGROUND OF THE INVENTION

A. Field of Invention

The present invention relates to a hydrodynamic bearing, and, in particular, to a hydrodynamic bearing for rotatably supporting a rotor about a stationary shaft. The present invention also relates to an electric motor having a rotor supported on the stationary shaft through the hydrodynamic bearing.

B. Description of Related Art

Figure 1:
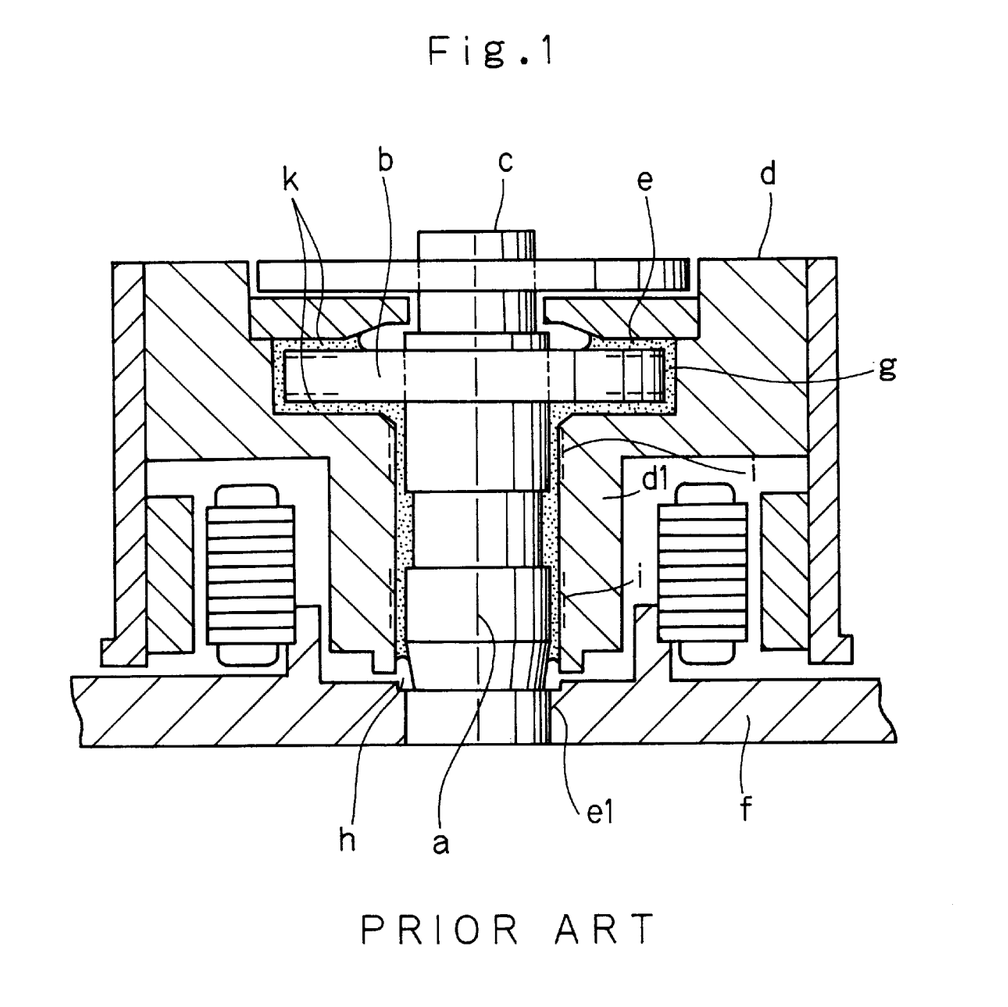
FIG. 1 is a cross sectional side view of a prior art spindle motor used in devices such as computer hard disk drives.

FIG. 1 is a cross sectional view of a conventional spindle motor (an electric motor) provided with a hydrodynamic bearing which makes use of the dynamic pressure of a lubricating fluid for driving at least one data storage media such as hard disk.

Referring to FIG. 1 the spindle motor includes a rotational sleeve d which constitutes a part of a rotor rotatably supported through a lubricant fluid e by a stationary shaft c having a thrust plate b radially outwardly extending from a shaft member a through a lubricating fluid e.

An axially lower end portion (base portion) of the stationary shaft c is fixed to base member f and an axially upper end portion (top portion) is fixed to, for instance, a cover member of a hard disk drive. The rotational sleeve d includes a journal portion di and a grooved portion g defined within the inner periphery surface of the journal portion d1. The inner peripheral surface of the journal portion d1 and the outer peripheral surface of the shaft member oppose with each other through a gap beneath the grooved portion g toward the axially lower end portion of the rotational sleeve d. And the thrust plate b is positioned within the grooved portion g though a gap.

The lubricating fluid is filled within each gap thereby a pair of radial bearings i are constituted between the inner peripheral surface of the journal portion d1 and the outer peripheral surface of the shaft member a and a thrust bearing is also constituted between the upper and lower surface of the grooved portion g and the upper and lower surface of the thrust plate b.

In the spindle motor having the conventional hydrodynamic bearing device, the lubricating fluid e of the radial bearing i sometimes moves toward the axially upper side (toward the top portion of the stationary shaft c) due to various factors such as production tolerances, errors during assembly or heat deformation during rotation of the rotor d. The movement of the lubricating fluid e as mentioned above leads to reduction in the amount of the lubricating fluid held in the radial bearing i. Such reduction of the lubricating fluid e causes problems such as reduction of the precision of the rotation and the operation life of the hydrodynamic bearing device or even the spindle motor.

On the other hand, there are other conventional hydrodynamic bearing devices that include an annular space filled with air interposed to separate the lubricating fluid held in the radial bearing and the lubricating fluid held in the thrust bearing. In the case of such hydrodynamic bearing device, since the lubricating fluid held in the radial bearing i moves toward the axially lower side (toward the base portion of the stationary shaft c) due to various factors such as production tolerances, errors during assembly or heat deformation during rotation of the rotor d. The movement of the lubricating fluid e as mentioned above leads to reduction of the amount of the lubricating fluid held in the radial bearing i. Such reduction of the lubricating fluid e causes similar problems as above described.

In the conventional hydrodynamic bearing device shown in FIG. 1, when the rotor d does not rotate, the lubricating fluid is held in the gap so as to retain the lower end side interface e1 of the lubricating fluid e within a tapered portion h by surface tension of the lubricant. The tapered portion h is inwardly tapered toward the lower end side (base portion side) of the shaft portion a so as to form a taper seal portion.

In the conventional hydrodynamic bearing device shown in FIG. 1, when the rotor d starts to rotate, centrifugal forces are applied to the lubricating fluid e held within the gap defined between the stationary shaft c and the rotor d. As a result, the lubricating fluid e easily oozes along the inner peripheral surface of the journal portion d1 toward the axially lower side thereby causing the leakage of the lubricating fluid e.

SUMMARY OF THE INVENTION

It is a general object of the present invention to provide a hydrodynamic bearing device.

It is a related object of the present invention to provide a hydrodynamic bearing device which can support a rotational member for precise rotation.

It is another related object of the present invention to provide a hydrodynamic bearing device which can support a rotational member with high oil sealing performance for precise rotation.

It is further related object of the present invention to provide a hydrodynamic bearing device having long operation life.

It is an object of the present invention is to provide a hydrodynamic bearing device which can retain a lubricating fluid of a radial bearing portion by limiting the movement of the lubricating fluid toward the axially upper portion of a shaft.

It is another object of the present invention is to provide a hydrodynamic bearing device which can retain a lubricating fluid of an upper radial bearing portion by limiting the movement of the lubricating fluid toward the lower radial bearing portion of the shaft with the lubricating fluid being separated between the radial bearing portion and the thrust bearing portion.

It is a further object of the present invention to provide a hydrodynamic bearing device which seals lubricating fluid at an axially lower end portion of the lower radial bearing portion even if centrifugal forces act on the lubricating fluid during the rotation of a rotational member or if oil migration phenomena tends to occur.

It is another object of the present invention to provide a spindle motor having a hydrodynamic bearing device that is reliable in operation and life.

It is a further object of the present invention to provide a reliable and long-life spindle motor for use in a hard disk drive.

It is another object of the present invention to prevent losses or reduction of lubricating fluid in a radial bearing portion by limiting the movement of the lubricating fluid toward an axially upper portion of a stationary shaft.

It is another object of the present invention is to prevent reduction of the lubricating fluid in an upper radial bearing portion by the limiting the movement of the lubricating fluid toward the lower radial bearing portion of the shaft when the lubricating fluid in each of the radial bearing portion and the thrust bearing portion is separated by an air gap.

It is a further object of the present invention to prevent escape of the lubricating fluid from axially lower end portion of the lower radial bearing portion due to centrifugal forces during the rotation of the rotor.

In accordance with a hydrodynamic bearing device of the present invention, a thrust bearing composed of an upper and lower surface of a stationary thrust plate and a rotational member and a first and a second radial bearing formed by an outer surface of a stationary shaft and an inner surface of a rotational member are separated from each other by a first air interposition formed between the thrust bearing and the first radial bearing and a second air interposition formed between the first radial bearing and the second radial bearing. Tapered seals are provided at the first and the second air interposition for keeping the lubricating fluid in position by capillary action. The first and the second air interposition communicates with the external atmosphere through at least one communicating hole or channel.

As the result of the upper and the lower interfaces of the lubricating fluid of the first radial bearing being kept within the tapered seal, when the rotor starts to rotate and the lubricating fluid held in the first radial bearing tries to move toward axially upper or lower side by various factors such as tolerances, errors during assembly or heat deformation, the air held within the first or the second air interposition quickly enters an upper or a lower portion of the first radial bearing so that an upper or a lower portion of a plurality of herringbone grooves formed on the first radial bearing for generating hydrodynamic pressure within the lubricating fluid is exposed in the air thereby the fluid dynamic pressure generated in the first radial bearing is balanced and the movement of the lubricating fluid as described above is limited.

An air space is formed at an axially lower side (base side) of the second radial bearing. The air space defines a tapered seal for forming an interface of the lubricating fluid held in the lower radial bearing by capillary action. An annular lubricant leakage prevention means such as an annular step or an annular groove is formed on the outer surface of the stationary shaft or the inner surface of the rotational member so as to prevent the lubricating fluid of the second radial bearing from oozing along one surface of the tapered seal and leaking to the outside of the hydrodynamic bearing due to centrifugal forces or oil migration phenomena.

DETAILED DESCRIPTION OF THE INVENTION

Figure 2:
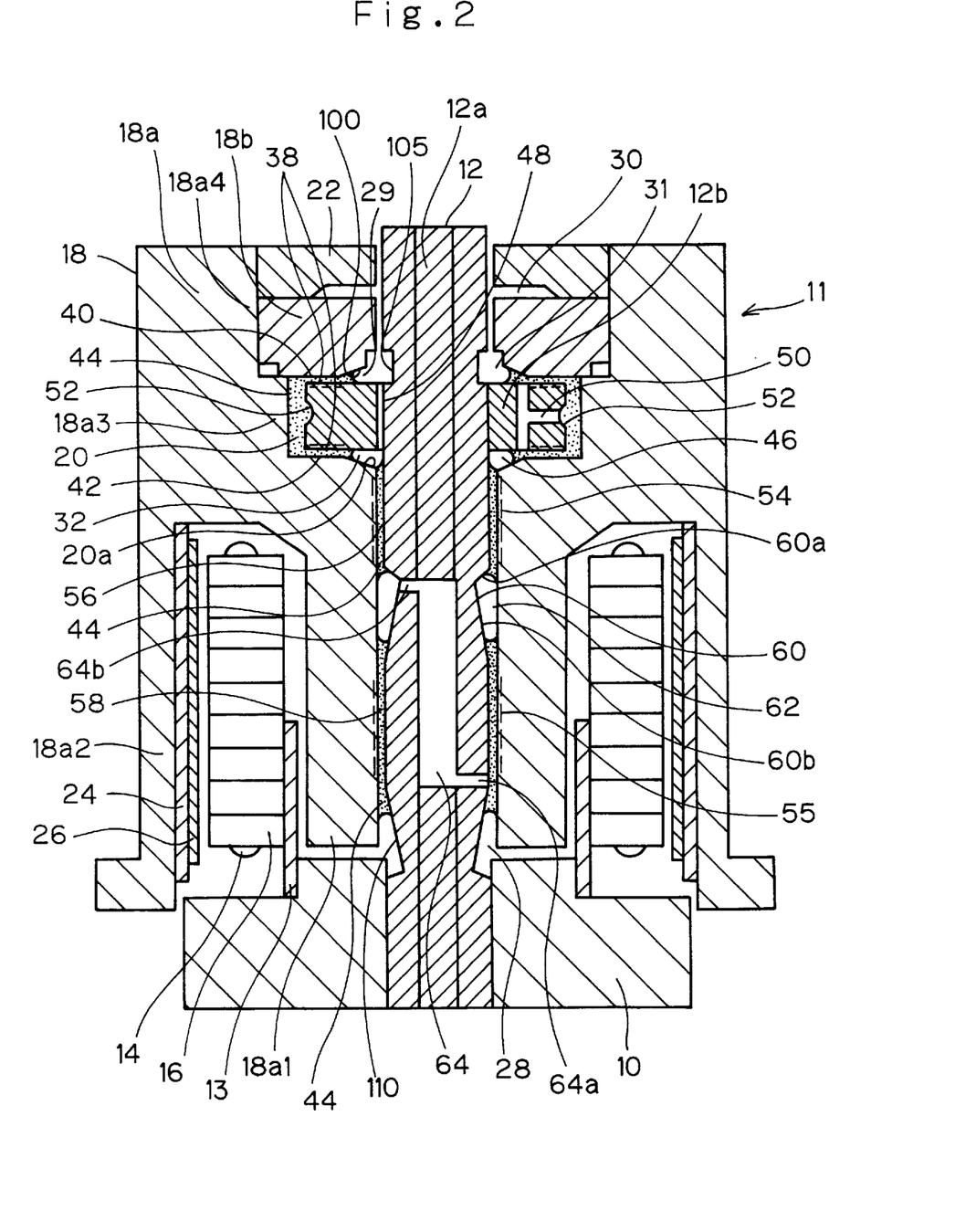
FIG. 2 is a cross sectional side view of a spindle motor according to the present invention, for use in devices such as a computer hard disk drives, in accordance with a first embodiment of the present invention.
Figure 3:
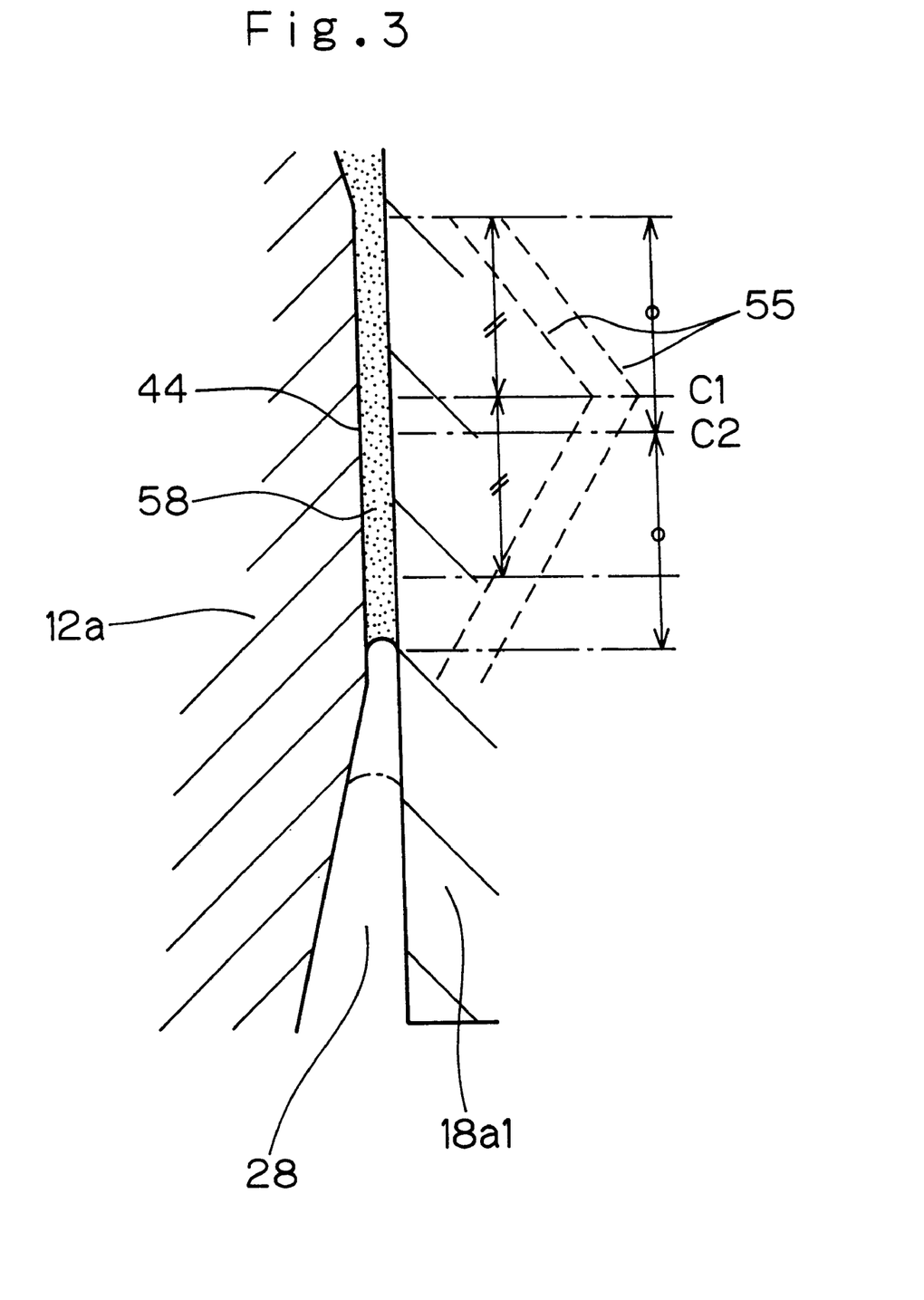
FIG. 3 is an enlarged cross sectional side view of a portion of the spindle motor depicted in FIG. 2, showing an area of the spindle motor in the proximity of a lower radial bearing showing details of a gap defined proximate a lower end of the lower radial bearing.

A first embodiment of the present invention is depicted in FIGS. 2 and 3. FIG. 2 is a cross sectional view of a spindle motor for rotating, for instance, the hard disk of a hard disk drive. The spindle motor of the present invention includes a new configuration of a hydrodynamic bearing, as described in greater detail below. FIG. 3 is a cross sectional view of a portion of the hydrodynamic bearing on an enlarged scale.

The spindle motor of the present invention includes a stationary shaft 12 fixed to a base 10 and a rotor 11 rotatably supported by the stationary shaft 12 via a hydrodynamic bearing whose components and configuration are described in greater detail below.

A lower end of the stationary shaft 12 is fixedly fitted in a coupling bore of a base 10 (base portion). A cylindrical support member 13 is fixed on an outer periphery of the upper cylindrical portion of the base 10 and extends upward (with respect to FIG. 2) from the base 10. A stator core 16, about which a stator coil 14 is wound, is carried on an outer peripheral surface of the cylindrical support member 13.

The stationary shaft 12 includes two main components: a stationary shaft portion 12a which extends rigidly upward from the base 10; and a stationary thrust plate 12b (thrust plate) which is an annular plate member fixedly and coaxially fitted to an upper portion of the stationary shaft portion 12a. The stationary shaft portion 12a and the stationary thrust plate 12b can be manufactured as two separate members later assembled together or may be manufactured as a single solid member made continuously from a single material. In the present embodiment, as shown in FIG. 2, the stationary shaft portion 12a and stationary thrust plate 12b are two separate members assembled together to constitute the stationary shaft 12.

The rotor 11 includes a rotary sleeve 18, a cylindrical rotor yoke 24, and a rotor magnet 26. The rotary sleeve 18 fits over the outer periphery of the stationary shaft 12 with a gap defined between opposing surfaces of the stationary shaft 12 and of the rotary sleeve 18. The rotary sleeve 18 includes a cylindrical rotor hub 18a and an annular rotary thrust plate 18b fixedly fitted into a portion of the rotary sleeve 18, as is described below.

A hard disk (not shown) of a hard disk drive is carried on an outer peripheral portion of a cylindrical surface of the cylindrical rotor hub 18a. The lower half of the cylindrical rotor hub 18a is formed with two concentric cylindric extensions, each having a tubular shape. The inner of the two concentric cylindric extensions is a journal portion 18a1. The outer of the two concentric cylindric extensions is a supporting portion 18a2 that supports rotor magnets 26. The journal portion 18a1 loosely fits over the outer periphery of the stationary shaft portion 12a between the stationary thrust plate 12b and the base 10. A middle inner diameter portion 18a3 having an inner diameter larger than an inner diameter of the journal portion 18a1 is formed on the rotor hub 18a above the journal portion 18a1. A large inner diameter portion 18a4 having an inner diameter larger than the inner diameter of the middle diameter portion 18a3 is formed on the rotary sleeve 18 above the middle diameter portion 18a3.

The rotary thrust plate 18b is fixedly fitted in the large inner diameter portion 18a4 to partially define a thrust bearing gap 20 around the stationary thrust plate 12b. The thrust bearing gap 20 is defined between the opposing surfaces of the stationary and rotary thrust plates 12b and 18b and between the surfaces of the stationary thrust plate 12b and the side and bottom surfaces of the recess formed within the middle inner diameter portion 18a3. Above the rotary thrust plate 18b in the large inner diameter portion 18a4, an annular plate-shaped seal member 22 is fixedly fitted in place.

The stationary shaft 12 is shown fixed to the base 10 at the lower end thereof but will also be fixed to a member such as a cover (not shown) of a hard disk device at an upper end portion thereof. This way, stable rotation of the rotary sleeve body 18 can be assured since the stationary shaft 12 is supported at both of its ends.

On an inner periphery of the rotor magnet supporting portion 18a2 of the cylindrical rotor hub 18a, the cylindrical rotor yoke 24 made of ferromagnetic material is fixedly coupled. The rotor magnet 26 is fixedly fitted to an inner periphery of the cylindrical rotor yoke 24 around the stator core 16. However, an annular gap is maintained between the rotor magnet 26 and the stator core 16.

Thrust Bearing

The radially inner portion of the surface which partially defines the upper portion of the thrust groove 20, specifically, the radially inner portion of the bottom or lower inclined surface 100 of the rotary thrust plate 18b, is tapered such that the lower inclined surface 100 of the rotary thrust plate 18b is inclined upward toward the center of the stationary shaft 12. As a result, a air space 29 defined between the lower inclined surface 100 of the rotary thrust plate 18b and the upper flat surface of the stationary thrust plate 12b progressively increases toward the center of the stationary shaft 12 to form a tapered seal.

In the interior of the air space 29, a further enlarged annular space 31 is formed by an annular groove 105 on an outer peripheral surface of the stationary shaft portion 12a and an annular recess or cut-out formed on the portion of the inner peripheral surface of the rotary thrust plate 18b that adjacently faces the groove 105. The annular space 31 is enlarged both in the radial and axial directions as compared with the taper seal.

An oil repellent treatment is made above the annular space 31 with an oil repellent agent being coated on the inner radial surface of the rotary thrust plate 18b and on the portion of the outer radial surface of the stationary shaft portion 12a that adjacently faces the inner peripheral surface of the rotary thrust plate 18b with a comparatively narrow gap.

An annular concave recess or cavity is formed at a radially inward portion of a lower surface of the seal member 22. The annular concave recess of the seal member 22 and an upper surface of the rotary thrust plate 18b define an annular lubricant catching groove 30. The lubricant catching groove 30 is open radially inward in the direction of the stationary shaft 12. Further, an oil repellant treatment is made with an oil repellant agent being coated on the inner peripheral surface of the seal member 22 and on the portion of the outer peripheral surface of the stationary shaft portion 12a that adjacently faces the inner peripheral surface of the seal member 22 with a small gap of, for instance, about 50 μm.

A radially inner portion of the surface of the rotary sleeve 18 that defines the lower portion of the thrust bearing gap 20, i.e. the bottom surface of the middle inner diameter portion 18a3 of the rotary sleeve 18, is formed with a tapered surface 20a that is inclined downward toward the radially inner direction. A second oil separating gap is formed between the tapered surface 20a and the portion of the lower surface of the stationary thrust plate 12 that adjacently faces the tapered surface 20a. The first oil separating space 32 progressively increases towards the shaft 12 thereby forming a tapered seal.

On each of the upper and lower surfaces of the stationary thrust plate 12b, a herringbone grooves 38 are formed for generating fluid dynamic pressure. It should be understood that other configurations of grooves for dynamic pressure generation other than herringbone grooves may be used as well. An upper thrust bearing 40 is formed by the upper surface of the stationary thrust plate 12b and the lower surface of the rotary thrust plate 18b. A lower thrust bearing 42 is formed by the lower surface of the stationary thrust plate 12b and the bottom surface of the middle inner diameter portion 18a3 of the rotary sleeve 18.

Lubricant 44 is provided as needed in the gap between the stationary shaft 12 and the rotary sleeve 18, in particular in the regions depicted in FIG. 2. The lubricant 44 is retained at each respective position by tapered seals described above, and in particular as a result of the surface tension created on the surface of the lubricant 44.

The lubricant 44 may be any of various lubricants, such as spindle oil, can be used. The effects of surface tension in the lubricant 44 cause formation of a meniscus in each exposed portion of the lubricant 44, for example between the lower inclined surface 100 and the adjacent surface of the stationary thrust plate 12b. The meniscus, in effect, defines an interface between the lubricant and air. There are upper and lower interfaces defined by the meniscus of the lubricant 44 in the annular gaps between the walls defining the thrust bearing gap 20 and the surfaces of the stationary thrust plate 12b. The upper and lower interfaces face radially inward at the air space 29 and first oil separating space 32. An annular oil-free space 46 is defined at an inner periphery from the lower interface (lower meniscus) of the lubricant 44 at the first oil separating space 32.

It should be appreciated that the tapered surfaces 100 and 29a promote the effects of surface tension on the lubricant, thus defining the interfaces (meniscus), which assist in retaining the lubricant 44 in place.

On an inner peripheral surface of the stationary thrust plate 12b, an axial groove is formed. When the stationary thrust plate 12b is fixedly fitted on the stationary shaft portion 12a, the axial groove defines a breathing bore 48 between the outer peripheral surface of the stationary shaft portion 12a and the inner peripheral surface of the stationary thrust plate 12b. The breathing bore 48 connects the annular oil free space 46 to the air outside of the spindle motor via the annular space 31, a gap between the outer peripheral surface of the stationary shaft portion 12a and the inner peripheral surfaces of the rotary thrust plate 18b, the lubricant catching groove 30, and a gap between the outer peripheral surface of the stationary shaft portion 12a and the seal member 22. The breathing bore 48 has a cross sectional size that is large enough so as not to be closed by the lubricant 44 due to surface tension. The breathing bore 48 can be formed at a plurality of positions of the stationary thrust plate 12b.

By forming the breathing bore 48 having such a cross sectional size, gas or air can be reliably communicated into the annular oil free space 46 from the outside the spindle motor. At the same time, gas bubbles which may form or may be mixed in the lubricant 44 accidentally can be exhausted to outside of the spindle motor. It should be appreciated that the breathing bore 48 further serves to equalize gas pressure on each side of the stationary thrust plate 12b.

Herringbone grooves 38 are formed on radially outer peripheral portions of the upper thrust bearing 40 and the lower thrust bearing 42 to generate dynamic pressure in the oil to support the rotor 11. The herringbone grooves 38 are formed asymmetrically to generate dynamic pressure which moves the lubricant 44 in the upper and lower thrust bearings 40 and 42 radially outward as the rotary sleeve 18 rotates.

A lubricant circulation path 50 is formed within the stationary thrust plate 12b. The lubricant circulation path 50 has a rotated T-shape as viewed in FIG. 2, and is open at three surfaces of the stationary thrust plate 12b. Specifically, the lubricant circulation path is open at the outer peripheral surface of the stationary thrust plate 12b, and at the portions of the upper and lower surfaces of the stationary thrust plate 12b that are radially within the upper and lower thrust bearings 40 and 42 but at a radially inward portion thereof. Therefore, the lubricant circulation path 50 is open to both thrust bearings 40 and 42 on the upper and lower surfaces of the stationary thrust plate 12b. A groove 52 having an arch-shaped cross-section, is formed throughout around the radial outer circumference of the stationary thrust plate 12b. One of the openings of the lubricant circulation path 50 is open to the groove 52. It should be understood that one or several of the lubricant circulation path 50 may be formed in the stationary thrust plate 12b at angularly or circumferentially spaced apart locations, all of the paths 50 being open to the groove 52.

In the above described structure, when the rotary sleeve 18 rotates, the lubricant 44 in the upper and lower thrust bearings 40 and 42 moves radially outward, and then flows into the lubricant circulation paths 50 of the stationary thrust plate 12b from its radially outer periphery. After that, the lubricant 14 runs out into radially inner portions of the upper and lower thrust bearings 40 and 42 over the upper and lower surfaces of the stationary thrust plate 12b. Thus, the lubricant 44 circulates through and over the stationary thrust plate 12b. Due to the circulation of the lubricant 44, bubbles inside the lubricant 44 filled in the thrust bearing gap 20, especially bubbles in the lubricant over the outer peripheral portions of the upper and lower thrust bearings 40 and 42 are exhausted to the outside atmosphere through the interfaces of the lubricant 44 at the inner radial portions of the upper thrust bearing 40.

Radial Bearing

A tapered surface 110 on an outer peripheral portion of the stationary shaft portion 12a that faces a lower end portion of the cylindrical rotor hub 18a is tapered in a manner such that the diameter of the shaft progressively decreases in a downward direction. As a result, the air space 28 between the tapered surface 110 of the stationary shaft portion 12a and the inner peripheral surface of the journal portion 18a1 forms a tapered seal which progressively increases in a downward direction in order to take advantage of the surface tension of the lubricant 44 to create a meniscus. Oil repellent treatment is applied to the lower end portion of the inner peripheral surface of the journal portion 18a1 with an oil repellent agent being coated thereon.

On the upper and lower portions of the inner peripheral surface of the journal portion 18a1, herringbone grooves 54 and 55 are formed, respectively, for generating dynamic pressure. It should be understood that dynamic pressure generation grooves other than herringbone grove can also be used.

An upper radial bearing 56 and a lower radial bearing 58 are formed by the herringbone groove portions 54 and 55, respectively, of the inner peripheral surface of the journal portion 18a1 and the portions of the outer peripheral surface of the stationary shaft member 12a that face the herringbone grooves 54 and 55. The upper radial bearing 56 is located immediately beneath the first oil separating space 32. The lower radial bearing 58 is located between the air space 28 and a second oil separating space 62, which is described in greater detail below.

The herringbone groove 55 for generating dynamic pressure at the lower radial bearing 58 extends downward to just above the air space 28. As shown in FIG. 3, the herringbone grooves 55 are designed such that dynamic pressure generated in the lubricant 44 by the herringbone groove 55 during rotation of the rotary sleeve 18 has an axial dynamic midpoint C1 which is above the axial geometric center C2 of the lower radial bearing 58. Gaps between the inner peripheral surface of the journal portion 18a1 and the outer peripheral surface of the stationary shaft portion 12a are usually a few or several micrometers wide at the upper and lower radial bearings 56 and 58. With the herringbone grooves 55 of the design described above, the lubricant 44 in the lower radial bearing 58 receives an upward force when the rotary sleeve 18 rotates. In other words, as the rotary sleeve 18 rotates, the lubricant 44 is moved in an upward direction with respect to the stationary shaft 12 in FIG. 2. The importance of the upward movement of the lubricant 44 in the radial bearing 58 is explained in greater detail below.

An annular concave recess 60 which opens radially outward is formed on the outer peripheral surface of the stationary shaft portion 12a between the upper and lower radial bearings 56 and 58. The concave recess 60 is formed by upper inclined surface 60a and lower inclined surface 60b. The upper surface 60a of the annular concave recess 60 is axially short and largely or steeply tapered such that the outer diameter of the shaft decreases largely in a relatively short axial, downward direction. Whereas the lower surface 60b of the annular concave recess 60 is comparatively axially long and moderately tapered such that the outer radius decreases relatively gradually in an upward direction over a greater axial length.

The second oil separating space 62 is formed between the annual concave recess 60 and the radially inner surface of the journal portion 18a1. An upper portion of the second oil separating space 62 defines a base side tapered seal for keeping the lubricant 44 in the upper radial bearing 56, and a lower portion of the second oil separating space 62 provides an upper side tapered seal for keeping the lubricant 44 in the lower radial bearing 58. Specifically, the surface 60a provides a means for enhancing the surface tension on the lubricant 44 at a lower end of the upper radial bearing 56 and the surface 60b provides a means for enhancing the surface tension on the lubricant 44 at an upper portion of the lower radial bearing 58.

As described above, the upper surface 60a has a relatively short axial length, whereas the lower surface 60b has a relatively long axial length. In this embodiment, a lower end side interface of the lubricant 44 in the upper radial bearing 56 is disposed at the upper portion of the second oil separating space 62, whereas an upper end side interface of the lubricant 44 in the lower radial bearing 58 is disposed at the lower portion of the same.

A lower end side end of the herringbone groove 54 at the upper radial bearing 56 extends to the upper portion of the annular concave recess 60. Therefore, the lower end side interface of the lubricant 44 in the upper radial bearing 56 and the lower end side end of the upper radial bearing 56 are in the proximity of each other.

An upper end side interface of the lubricant 44 in the upper radial bearing 56 is kept at a position below the first oil separating space 32 by surface tension. The lubricant 44 at the upper radial bearing 56 is separated from the lubricant 44 at the lower thrust bearing 42 by the annular oil free space 46.

The lower end interface of the lubricant 44 at the lower radial bearing 58 is disposed on the air space 28.

An air communication or conduit bore 64 is formed inside the stationary shaft portion 12a. The bore 64 includes a lower opening 64a which is open to the lubricant 44 in the lower radial bearing 58, and the bore 64 includes an upper opening 64b which is open to the second oil separating space 62. The lower opening 64a is disposed in the proximity of a boundary between the lower radial bearing 58 and the air space 28. The upper opening 64b is disposed in the proximity of a boundary between the upper portion and the lower portion of the second oil separating space 62.

The bore 64 may be formed by first forming a bore that passes vertically through the axial center of the stationary shaft portion 12a, forming openings 64a and 64b by forming radial bores from the outer peripheral surface of the stationary shaft portion 12a, and thereafter plugging or filling the pass-through bore below and above the openings 64a and 64b respectively. Each of the openings 64a and 64b can be plural, if desired or deemed necessary.

When the rotary sleeve 18 is not in motion, the lower opening 64a is covered with the lubricant 44 to prevent vaporization of the lubricant 44 facing the second oil separating space 62 and therefore shortage of lubricant due to vaporization. On the other hand, while the rotary sleeve 18 rotates, as described above, the herringbone grooves 55 urge the lubricant upward and the lower end interface of the lubricant 44 at the lower radial bearing 58 is drawn upward just above the air space 28 or further as a result of the upward movement of the lubricant 44, the lower opening 64a of the bore 64 becomes open to the lower portions of the spindle motor and also become open to outside the spindle motor via the air space 28 and the space around the stator 16 and lower portions of the rotor 18.

The herringbone groove 54 at the upper radial bearing 56 is formed such that dynamic pressure to move the lubricant 44 upward is generated within a range of production tolerance, during rotation of the rotary sleeve 18.

Operation of the Upper Radial Bearing I

In the above described structure, when pressure large enough to move the lubricant 44 upward is generated in the upper radial bearing 56 during rotation of the rotary sleeve 18 due to such reasons as variations due to tolerances, errors in assembly, or heat induced deformation, the lower end side interface of the lubricant 44 located at the upper portion of the second oil separating space 62 moves upward. Since the axial length of the upper portion of the tapered seal (at the surface 60a) is short, and the lower end interface of the lubricant 44 is proximate the lower end of the upper radial bearing 56 (the lower end of the herringbone grooves 54), gas below the lower end interface of the lubricant 44 is drawn into the upper radial bearing 56 at the stage while the lubricant 44 moves only a little. Then, the lower end of the herringbone grooves 54 are exposed to the air and the lubricant 44 cannot be filled in the lowermost end of the grooves 54. As a result, the pressure to move the lubricant 44 upward decreases since the exposed portions of the herringbone grooves no longer have an effect on the lubricant, and the forces acting on the lubricant 44 become balanced. Therefore, the amount of upward movement of the lubricant 44 can be kept relatively small.

Operation of the Bore 64

When pressure to move the lubricant 44 upward is generated at the upper radial bearing 56 during rotation of the rotary sleeve 18, and the lubricant 44 moves upward, the lower opening 64a becomes open to the air space 28. Then, gas or air is allowed to enter into the lower end side of the upper radial bearing 56, through the lower opening 64a and the bore 64. Since the lower end side interface of the lubricant 44 is disposed in the proximity of the upper radial bearing 56, gas enters into the upper radial bearing 56 at a stage while the lubricant moves upward a little. Therefore, air or gas pressure is balanced and the amount of upward movement of the lubricant 44 is relatively small since the herringbone grooves 54 becomes exposed, and pressure to move the lubricant 44 upward decreases.

Operation of the Upper Radial Bearing II

When forces (pressure) are generated at the upper radial bearing 56 to urge the lubricant 44 in the bearing 56 downward during rotation of the rotary sleeve 18 due to such reasons as variations in tolerances, errors in assembly, or heat deformation and the lubricant 44 moves downward, the upper end side interface of the lubricant 44 held at the upper radial bearing 56 correspondingly moves downward. Then, gas above the interface is drawn to the upper radial bearing 56. Thus, the pressure to moved the lubricant 44 downward decreases, and the amount of downward movement of the lubricant 44 can be kept relatively small.

Air moves through the breathing bore 48 as the gas in the first oil separating space 32 expands or contracts.

Operation of the Lower Radial Bearing

When the rotary sleeve 18 is not in motion, the lower end side interface of the lubricant 44 at the lower radial bearing 58 is retained at the air space 28 by surface tension.

When the rotor rotates, a centrifugal force is applied to the lubricant 44 filled in the gap between the stationary shaft 12 and the rotary sleeve 18. As a result, lubricant 44 likely tends to move downward along the inner peripheral surface of the journal portion 18a1 and leaks or oozes out. However, the lower end interface of the lubricant 44 held at the lower radial bearing 58 is drawn upward above the air space 28 or further due to the herringbone grooves 55 in the lower radial bearing 58. Therefore, the likelihood of dispersion and leakage of the lubricant 44 due to a centrifugal force can be reduced or prevented.

Second Embodiment

Figure 4:
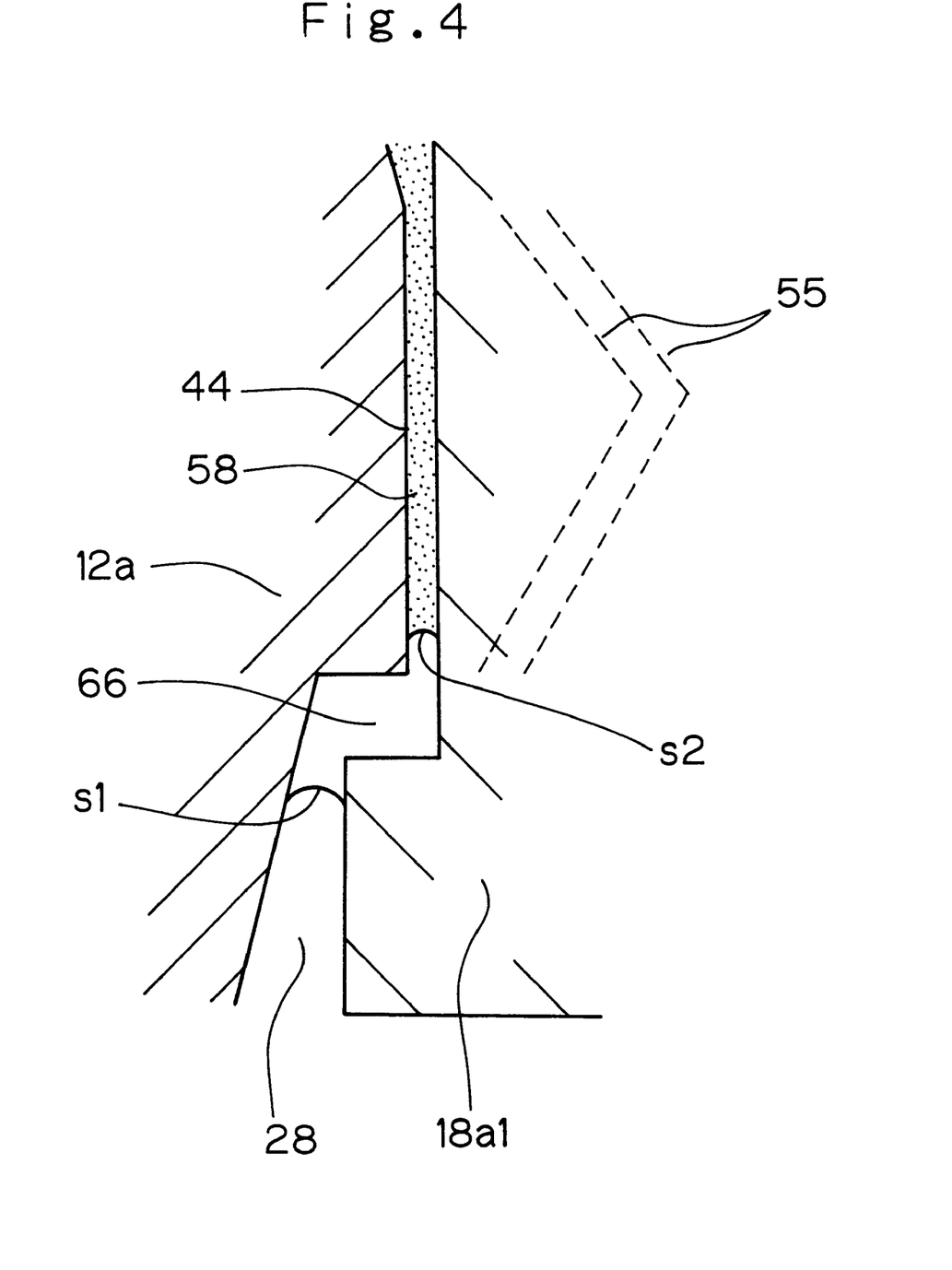
FIG. 4 is an enlarged cross sectional view similar to FIG. 3 showing details of a lower radial bearing and a gap defined on a lower end side of the lower radial bearing in accordance with a second embodiment of the present invention.

FIG. 4 is an enlarged partial view of a spindle motor in accordance with a second embodiment of the present invention. FIG. 4 shows a lower radial bearing 58 and a air space 28 of the hydrodynamic bearing device.

In the second embodiment, the inner peripheral surface of the journal portion 18a1 has a stepped portion 66 between the lower radial bearing 58 and the air space 28. The journal portion 18a1 has a smaller inner diameter at the stepped portion 66. The air space 28 is located radially inward from the radial bearing 58 and below the lower radial bearing 58. While the rotary sleeve 18 is not in motion, a lower end interface S1 (meniscus) of the lubricant 44 is located below the lower radial bearing 58 in the air space 28. However, when the rotary sleeve 18 rotates, the interface moves upward to define a new lower end interface S2 within the lower radial bearing 58, adjacent to the herringbone grooves 55 at the lower radial bearing 58, thus exposing a portion of the herringbone grooves 55.

As the rotary sleeve 18 rotates, the lower end side interface S2 of the lubricant 44 is drawn up into the lower radial bearing 58 by the interaction between the lubricant 44 and herringbone grooves 55. If a centrifugal force is applied to the lubricant 44 and the lubricant 44 moves downward along the inner peripheral surface of the journal portion 18$a$1, once the lubricant 44 reaches the stepped portion 66, the lubricant 44 has to move in the radially inner direction towards the inner peripheral side of the stepped portion 66 in order to move further downward. However, the centrifugal force due to the rotation of the rotary sleeve 18 prevents the radially inward movement of the lubricant 44, thereby preventing the lubricant 44 from leaking below the stepped portion 66.

Third Embodiment

Figure 5:
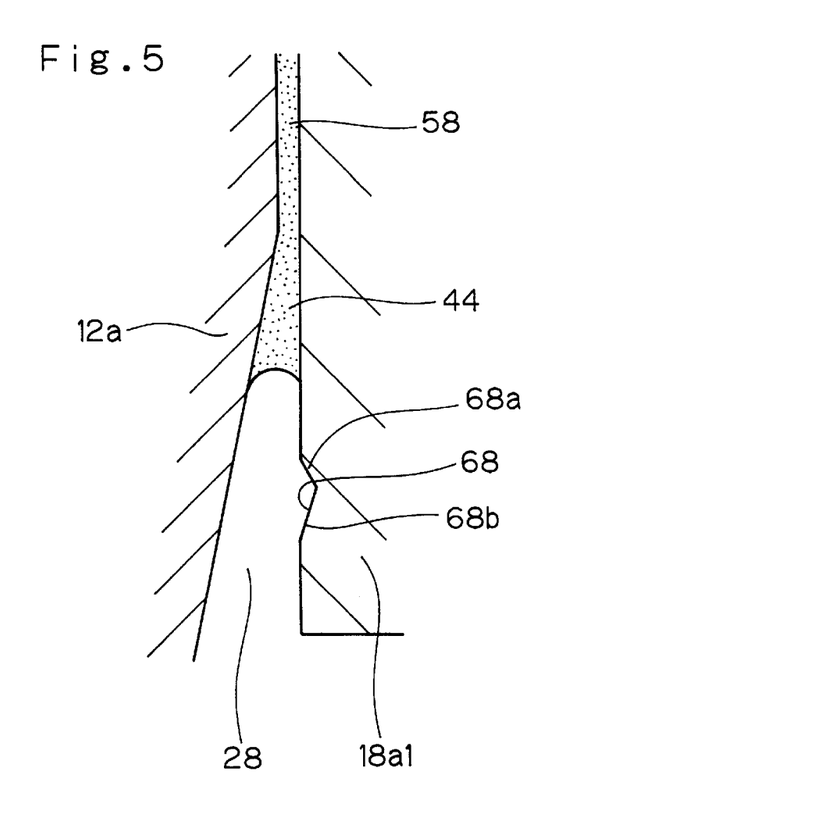
FIG. 5 is an enlarged cross sectional view similar to FIGS. 3 and 4 showing details of an area in the proximity of a lower radial bearing and a gap defined on a lower end side of the lower radial bearing in accordance with a third embodiment of the present invention.

FIG. 5 shows a third embodiment of the present invention.

In third embodiment, the inner peripheral surface of the journal portion 18$a$1 facing the air space 28 is vertical. An annular lubricant leakage prevention groove 68 is formed around the circumference of the inner peripheral surface at an axial intermediate position of the journal portion 18$a$1 facing the air space 28. The lubricant leakage prevention groove 68 has an upper tapered surface 68$a$ having a relatively large taper (that extends radially outward over a relatively short axial distance), and a lower tapered surface 68$b$ having a relatively small taper (that extends radially inward over a relatively long axial distance). In other words, on the upper tapered surface 68$a$ a path for the lubricant to flow along is short, whereas on the lower tapered surface 68$b$ a path for the lubricant to flow along is long.

In the third embodiment, if the lubricant 44 moves downward below the lower radial bearing 58 due to a centrifugal force during rotation of the rotary sleeve 18, and the lubricant 44 reaches the lubricant leakage prevention groove 68, the lubricant 44 can proceed toward the apex of the groove 68 easily while the lubricant 44 is on the upper tapered surface 68$a$, because the taper of the upper tapered surface is steep. However, when the lubricant 44 reaches the lower tapered surface 68$b$, the lubricant 44 has to move gradually radially inward to move further downward. Therefore, the centrifugal force due to the rotation of the rotary sleeve 18 and the long path on the lower tapered surface 68$b$ prevents the lubricant 44 from moving further downward. Thus, leakage of the lubricant 44 below the lubricant leakage prevention groove 68 can be prevented.

Fourth Embodiment

Figure 6:
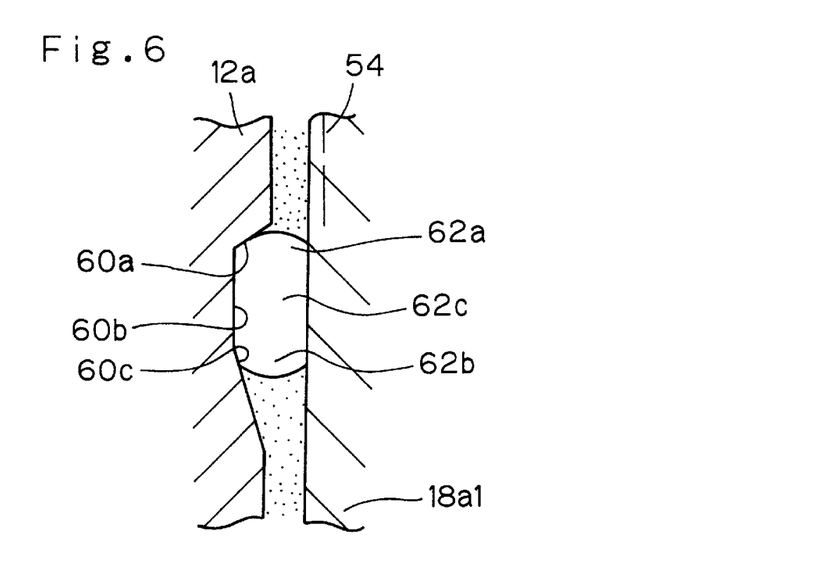
FIG. 6 is an enlarged cross sectional view of a hydrodynamic bearing of a spindle motor showing an area between an upper radial bearing and a lower radial bearing in accordance with a fourth embodiment of the present invention.

FIG. 6 shows a fourth embodiment of the present invention. In the fourth embodiment, the second oil separating space 62 is modified slightly. An upper portion 62$a$ of the second oil separating space 62 and a lower portion 62$a$ of the second oil separating space 62 may be spaced apart from one another. Specifically, the surface 60$a$ and the surface 60 may be spaced apart from one another by a surface 60$c$, as shown in FIG. 6. In the configuration shown in FIG. 6, the second oil separating space 62 is divided into three portions, the upper large tapered portion 62$a$, the lower small tapered portion 62$b$ and an intermediate straight or uniform width portion 62$c$.

It should be understood that the term gas in the above description of the various embodiments of the present invention indicates ambient air present around the hydrodynamic bearings and spindle motor of the present invention. Further, in the appended claims, the recited first tapered seal corresponds to the tapered seal at the upper end of the upper radial bearing 56.

The first tapered seal is defined between a lower, end of the inclined surface 20$a$ and an adjacent portion of the outer surface of the stationary shaft 12. As set forth in the appended claims, the second tapered seal corresponds to the tapered seal at the lower end of the upper radial bearing 56. The second tapered seal is defined approximately on a portion of the upper inclined surface 60$a$ and an adjacent portion of the surface of the stationary shaft 12. The third tapered seal recited in the appended claims corresponds to the tapered seal at the upper end of the lower radial bearing 58. The third tapered seal is defined approximately on a portion of the lower inclined surface 60$b$. and an adjacent portion, of the surface of the stationary shaft 12. The fourth tapered seal recited in the appended claims corresponds to the tapered seal at the lower end of the lower radial bearing 58. The fourth tapered seal is defined approximately on a portion of the tapered, surface 110 and an adjacent portion of the surface of the stationary shaft 12.

A hydrodynamic bearing device of the present invention can be used in various machines other than electrically powered machines.

The vertical expressions in the above description of embodiments are only for the convenience of explanation based on the figures, and are not to limit the way the inventions is actually used.

Effects of the Invention

In the hydrodynamic bearing and the spindle motor according to the present invention, the amount of movement of the fluid upward can be kept reduced when pressure to move the fluid upward is generated at in an upper radial bearing during rotation of the rotor.

What is claimed is:

1. A hydrodynamic bearing device for rotatably supporting a rotor on a stationary shaft, the stationary shaft having a shaft portion and a disk-shaped thrust plate, the shaft portion extending from a base to a distal end thereof, the thrust plate formed on a portion of the shaft portion proximate the distal end, the rotor having a recess defining thrust surfaces and having first and second journal portions, the first and second journal portion having inner radial surfaces facing outer radial surfaces of the shaft portion, the thrust surfaces axially facing upper and lower surfaces of the thrust plate, and said hydrodynamic bearing device comprising:

a thrust bearing defined at axial faces of the thrust plate of the stationary shaft and the thrust surfaces of the rotor, lubricant being disposed between the thrust plate and the thrust surfaces of the rotor;

a first radial bearing defined at the first journal portion of the rotor and adjacent surfaces of the shaft portion, lubricant being disposed between the surface of the first journal portion and the adjacent surfaces of the shaft portion;

a second radial bearing defined at the second journal portion of the rotor and adjacent surfaces of the shaft portion, lubricant being disposed between the surface of the second journal and the adjacent surfaces of the shaft portion, said first and second radial bearings being axially spaced apart from one another;

a first tapered seal and a second tapered seal defined at first and second sides of said first radial bearing for retaining lubricant in said first radial bearing, a first oil separating gap defined between said first radial bearing and said thrust bearing, said first oil separating gap being filled with gas separating lubricant in said thrust bearing and lubricant in said first radial bearing;

a third tapered seal and a fourth tapered seal defined on first and second sides of said second radial bearing, respectively, for retaining lubricant in said second radial bearing, a second oil separating gap being defined between said first radial bearing and said second radial bearing, said second oil separating gap being filled with gas for separating lubricant in said first radial bearing and lubricant in said second radial bearing, said second tapered seal and said third tapered seal being adjacent to one another;

means for connecting said second oil separating gap to the outside of said hydrodynamic bearing device during rotation of the rotor, said second tapered seal provided with an axial length such that an interface of the lubricant defined by a meniscus at said second radial bearing is located adjacent to said second side of said first radial bearing;

wherein said axial length of said second tapered seal relative to the shaft portion is shorter than an axial lenght of said third tapered seal and is shorter than an axial length of said fourth tapered seal portion;

each of said first, second, third and fourth tapered scale defines a corresponding gap, each of said corresponding gaps having a radial width larger than a radial width of a gap defined between the surfaces of the first journal portion and the adjacent surfaces of the shalt portion, and larger than a radial width of a gap defined between the surfaces of the second journal portion and the adjacent surfaces of the shaft portion;

said second tapered seal is tapered such that a corresponding surface of the shaft portion defining said second tapered seal is inclined having an axial length shorter than a radial length thereof and extending radially inward in a direction toward said second radial bearing; and said third tapered seal is partially defined by a surface of the shaft portion which extends radially inward toward said second tape red seal and has an axial length larger than a radial length thereof.

2. The hydrodynamic bearing device as set forth in claim 1, wherein the second journal of the rotor is formed with a means for urging a lubricant in said second bearing radial bearing toward said first radial bearing in response to rotation of the rotor.

3. The hydrodynamic bearing device as set forth in claim 1, wherein said means for connecting said second oil separating gap to outside said hydrodynamic bearing device during rotation of the rotor is restricted by the lubricant with the rotor being stationary with respect to the shaft portion.

4. The hydrodynamic bearing device as set forth in claim 3, further comprising a means for urging lubricant in said second bearing radial bearing toward said first radial bearing in response to rotation of the rotor, wherein said means for connecting said second oil separating gap to outside said hydrodynamic bearing device during rotation of the rotor comprises a bore formed in said shaft connected to a first opening and a second opening formed in the shaft portion, said first opening being open to said second oil separating gap and said second opening being adjacent to said fourth tapered seal, said second opening of said bore being covered with lubricant with the rotor in a stationary position with respect to the shaft portion, said second opening being open to the outside of said hydrodynamic bearing device in response to rotation of the rotor with respect to the shaft portion and operation of said means for urging lubricant in said second bearing radial bearing toward said first radial bearing in response to rotation of the rotor.

5. The hydrodynamic bearing device as set forth in claim 1, wherein said first radial bearing generates dynamic pressure in the lubricant such that the lubricant is urged toward said thrust bearing in response to rotation of the rotor.

6. The hydrodynamic bearing device as set forth in claim 1, further comprising a lubricant retaining means for retaining lubricant moving from said second side of said second radial bearing, said lubricant retaining means being formed adjacent to said second side of said second radial bearing.

7. The hydrodynamic bearing device as set forth in claim 6, wherein said lubricant retaining means comprises an annular recess formed on the shaft portion adjacent to said second side of said second radial bearing and adjacent to said fourth tapered seal, and the rotor is similarly formed with a protrusion which extends into said recess.

8. The hydrodynamic bearing device as set forth in claim 6, wherein said lubricant retaining means comprises an annular recess formed on the rotor adjacent to said fourth taper seal, said annular recess having a first tapered surface and a second tapered surface, said first tapered surface being closer to said fourth taper seal than said second tapered surface, said first tapered surface having an axial length shorter than an axial length of said second tapered surface.

9. The hydrodynamic bearing device as set forth in claim 1, further comprising a breathing bore formed on an inner peripheral end of the stationary shaft for connecting said first oil separating gap to the outside of said hydrodynamic bearing device.

10. A hydrodynamic bearing device for rotatably supporting a rotor on a stationary shaft, the stationary shaft having a shaft portion and a disk-shaped thrust plate, the shaft portion extending from a base side to a distal end thereof, the thrust plate formed proximate the distal end of the shaft portion, the rotor having a journal portion and thrust surfaces, the journal portion having an inner peripheral surface radially facing an outer radial surface of the shaft portion, the thrust surfaces axially facing upper and lower surfaces of the thrust plate, and said hydrodynamic bearing device comprising:

thrust bearing defined by said thrust surfaces, upper and lower surfaces of said thrust plate and lubricant retained therebetween;

a first radial bearing and a second radial bearing axially spaced apart from one another, each having lubricant retained between the shaft portion and the journal portion of the rotor defining said first and second radial bearings, an air gap interposing between said first radial bearing and said second radial bearing;

said thrust bearings being formed with dynamic pressure generating gooves, and said first and second radial bearings being formed with dynamic pressure generating grooves for generating hydraulic forces in said lubricant in response to rotation of said rotor;

said gap being fild with air so as to separate the lubricant retained in the first and second radial bearings, said gap being formed by an upper inclined surface extending away from said first radial bearing and a lower inclined surface extending away from said second radial bearing, said upper inclined surface having an axial length that is shorter than an axial length of said lower inclined surface such that a meniscus between said lubricant retained in said first radial bearing and the air within said gap is located adjacent to an axially lower end portion of said dynamic pressure generating grooves of said first radial bearing;

wherein, said meniscus moves in response to upward movement of said lubricant in said first radial bearing thereby exposing said axially lower portion of said dynamic pressure generating grooves of said first radial bearing to the air within said gap thereby causing a reduction in further upward movement of said lubricant caused by said axially lower portion of said dynamic pressure generating grooves of said first radial bearing; and means for connecting said gap between said first and second radial bearings to outside of said hydrodynamic bearing device during rotation of the rotor.

11. The hydrodynamic bearing device as set forth in claim 10, wherein said means for connecting is open in response to rotation of the rotor and is closed with the rotor being stationary with respect to the shaft portion.

12. The hydrodynamic bearing device as set forth in claim 11, further comprising a means for urging lubricant in said second radial bearing towards said first radial bearing in response to rotation of the rotor, wherein said means for connecting is a bore formed in the shaft portion having a first opening and a second opening, said first opening being open to said gap between said first radial bearing and said second radial bearing and said second opening being open to base side of said second radial bearing; and said second opening of said bore being covered with lubricant with the rotor in a stationary position with respect to said shaft portion, said bore being connected to outside the hydrodynamic bearing device in response to rotation of the rotor as said means for urging lubricant draws the lubricant towards said first radial bearing to expose said second opening.

13. A spindle motor comprising:

a stationary shaft having a shaft portion and a disk-shaped thrust plate fixed thereto, said shaft portion extending from the base to the distal end thereof, and said thrust plate formed proximate the distal end of said shaft portion, said shaft portion being further formed with a first and second radial bearing surfaces;

a rotor having first and second journal portions and a recess which defines thrust surfaces, said first and second journal portions having inner radial surfaces facing corresponding outer radial surfaces of said shaft portion, and said thrust surfaces axially facing upper and lower surfaces of said thrust plate, said thrust surfaces and said thrust plate defining a thrust bearing, said first journal portion and said first radial bearing surface define a first radial bearing, and said second journal portion and said second radial bearing surface define a second radial bearing;

a first tapered seal and a second tapered seal are defined at first and second sides of said first radial bearing for retaining lubricant in said first radial bearing, said first tapered seal having a first oil separating gap filled with gas separating lubricant in said thrust bearing and lubricant in said first radial bearing;

a third tapered seal and a fourth tapered seal defined on first and second sides of said radial bearing, respectively, for retaining lubricant in said second radial bearing, said third tapered seal having a second oil separating gap filled with gas for separating lubricant in said first radial bearing and lubricant in said second radial bearing, aid second tapered seal and said third tapered seal being adjacent to one another;

means for connecting said second oil separating gap to outside said spindle motor during rotation of the rotor; and wherein:

said second tapered seal has an axial length, relative to said shaft portion, which is shorter than an axial length of said third tapered seal and is shorter than an axial length of said fourth tapered seal portion;

each of said first, second, third and fourth tapered seals defines a corresponding gap, each of said corresponding gaps having a radial width larger than a radial width of a gap defined between surfaces of said first journal portion and said first radial bearing surfaces of said shaft portion, and larger than a radial width of a gap defined between surfaces of said second journal portion and said second radial bearing surfaces of said shaft portion;

said second tapered seal is tapered such that a corresponding surfaces of said shaft portion defining said second tapered seal is inclined radially inward having an axial length shorter than a radial length thereof and extends radially inward in a direction toward said second radial bearing; and said third tapered seal is partially defined by a surface of said shaft portion which extends radially inward toward said second tapered seal and said surface an axial length larger than a radial length thereof.

14. The spindle motor as set forth in claim 13, further comprising means for connecting said first oil separating gap to outside said spindle motor.

15. The spindle motor as set forth in claim 14, wherein said means for connecting said first oil separating gap to outside said spindle motor comprises a passage formed in said thrust plate.

16. The spindle motor as set forth in claim 13, wherein, said second tapered seal has an axial length which is relatively short such that an interface of the lubricant defined by a meniscus at said second radial bearing is located adjacent to said second side of said first radial bearing.

17. The spindle motor as set forth in claim 13, wherein said second tapered seal has an axial length, relative to said shaft portion, which is shorter than an axial length of said third tapered seal and is shorter than an axial length of said fourth tapered seal portion.

18. The spindle motor as set forth in claim 17, wherein each of said first, second, third and fourth tapered seals defines a corresponding gap, each of said corresponding gaps having a radial width larger than a radial width of a gap defined between surfaces of said first journal portion and said first radial bearing surfaces of said shaft portion, and larger than a radial width of a gap defined between surfaces of said second journal portion and said second radial bearing surfaces of said shaft portion;

said second tapered seal is tapered such that a corresponding surface of said shaft portion defining said second tapered seal is inclined radially inward having an axial length shorter than its radial length and extends radially inward in a direction toward said second radial bearing; and said third tapered seal is partially defined by a surface of said shaft portion which extends radially inward toward said second tapered seal and has an axial length larger than its axial length.

19. The spindle motor as set forth in claim 13, wherein said second journal of said rotor is formed with a means for urging lubricant in said second bearing radial bearing toward said first radial bearing in response to rotation of said rotor.

20. The spindle motor as set forth in claim 13, wherein said means for connecting said second oil separating gap to outside said spindle motor during rotation of said rotor is restricted by the lubricant with said rotor being stationary with respect to said shaft portion.

21. The spindle motor as set forth in claim 20, further comprising a means for urging lubricant in said second bearing radial bearing toward said first radial bearing in response to rotation of said rotor, wherein said means for connecting said second oil separating gap to outside said spindle motor during rotation of said rotor comprises a bore formed in said shaft connected to a first opening and a second opening formed in said shaft, said first opening being open to said second oil separating gap and said second opening being adjacent to said fourth tapered seal, said second opening of said bore being covered with lubricant with said rotor in a stationary position with respect to the shaft, said second opening being open to the outside of the spindle motor in response to rotation of said rotor with respect to the shaft and operation of said means for urging lubricant in said second bearing radial bearing toward said first radial bearing in response to rotation of said rotor.

22. The spindle motor as set forth in claim 13, wherein said first radial bearing generates dynamic pressure in the lubricant such that the lubricant is urged toward said thrust bearing in response to rotation of the rotor.

23. The spindle motor as set forth in claim 13, further comprising a lubricant retaining means for retaining lubricant moving from said second side of said second radial bearing, said lubricant retaining means being formed adjacent to said second side of said second radial bearing.

24. The spindle motor as set forth in claim 23, wherein said lubricant retaining means comprises an annular recess formed on said shaft portion adjacent to said second side of said second radial bearing and adjacent to said fourth tapered seal, and said rotor is similarly formed with a protrusion which extends into said recess.

25. The spindle motor as set forth in claim 23, wherein said lubricant retaining means comprises an annular recess formed on said rotor adjacent to said fourth taper seal, said annular recess having a first tapered surface and a second tapered surface, said first tapered surface being closer to said fourth taper seal than said second tapered surface, said first tapered surface having an axial length shorter than an axial length of said second tapered surface.

26. The spindle motor as set forth in claim 13, further comprising a breathing bore formed on an inner peripheral end of said shaft portion for connecting said first oil separating gap to outside said spindle motor.

27. A hydrodynamic bearing device comprising:

a stationary shaft formed upper and lower journal surfaces;

a rotor disposed about said stationary shaft, said rotor being formed with first and second journal portions, said first and second journal portions having inner radial surfaces facing said upper and lower journal surfaces, respectively, of said stationary shaft;

a first radial bearing defined at said first journal portion of said rotor and said upper journal surface of said shaft portion, lubricant being disposed between said first journal portion and said upper journal surface of said shaft portion, and at least one of said first radial surface and said upper journal surface being formed with dynamic pressure generating grooves;

a second radial bearing defined at said second journal portion of said rotor and said lower journal surface of said shaft portion, lubricant being disposed between said second journal portion and said lower journal surface of said shaft portion;

a first tapered seal and a second tapered seal defined at first and second sides of said first radial bearing for retaining lubricant in said first radial bearing;

a third tapered seal and a fourth tapered seal defined on first and second sides of said second radial bearing, respectively, for retaining lubricant in said second radial bearing, an oil separating gap being defined between said first radial bearing and said second radial bearing, said oil separating gap being filled with gas for separating lubricant in said first radial bearing and lubricant in said second radial bearing;

a means for connecting said oil separating gap to the outside of said hydrodynamic bearing device in response to rotation of the rotor, said second tapered seal provided with length such that a meniscus on the lubricant defined at said second radial bearing is located adjacent to said second side of said first radial bearing;

the axial length of said second tapered seal relative to said shaft portion is shorter than an axial length of said third tapered seal and is shorter than an axial length of said fourth tapered seal portion, said second tapered seal being tapered such that a corresponding surface of said shaft portion defining said second tapered seal is inclined radially inward having an axial length shorter than a radial length thereof and extending radially inward in, a direction toward said second radial bearing; and the inclination of said second tapered seal is such that in response to upward movement of lubricant in said upper radial bearing, said second tapered seal allows upward movement of the lubricant thereby exposing a lower portion of said dynamic pressure generating grooves in said upper radial bearings thereby reducing upward movement of the lubricant.

28. The hydrodynamic bearing device as set forth in claim 27, wherein:

each of said first, second, third and fourth tapered seals defines a corresponding gap, each of said corresponding gaps having a radial width, larger than a radial width of a gap defined between said first journal portion and said upper journal surface, and each of said corresponding gaps has a radial width that is larger than a radial width of a gap defined between said second journal portion and said lower journal surface; and said third tapered seal is partially defined by a surface of the shaft portion which extends radially inward toward said second tapered seal and has an axial length larger than a radial length thereof.

29. The hydrodynamic bearing device as set forth in claim 27, wherein said oil separating gap is located between said second and third tapered seals.

30. The hydrodynamic bearing device as set forth in claim 29, wherein:

said second radial bearing is formed with herringbone grooves that are configured to urge lubricant in the second radial bearing upward toward said second oil separating gap in response to rotation of said rotor;

said shaft portion is formed with an opening that is open to said oil separating gap, and said opening is open to a lower portion of said herringbone grooves of said second radial bearing; and said means for connecting said second oil separating gap to the outside of said hydrodynamic bearing device comprises said opening and said herringbone grooves in said second radial bearing.

31. A hydrodynamic bearing device for rotatably supporting a rotor on a stationary shaft, the hydrodynamic bearing device comprising:

the shall having a shaft portion and a disk-shaped thrust plate formed on the shaft portion, the rotor having thrust surfaces facing upper and lower surfaces of the thrust plate to form thrust bearings with lubricant being retained between the surfaces of the thrust plate and the rotor, the rotor further having a sleeve portion surrounding the shaft portion to form upper and lower radial bearings, dynamic pressure generating grooves being formed on at least one of the shaft portion and the sleeve portion at each of the upper and lower radial bearings, the upper and lower radial bearing being axially separated from each other by an air separating gap, said air separating gap being at least partially defined by an upper tapered surface and a lower tapered surface formed on the shaft portion, wherein a portion of said air separating gap between the shaft portion and the sleeve portion at said upper tapered surface increases in a downward direction, and a portion of said intermediate air separating gap between the shaft portion and the sleeve portion at said lower tapered surface decreases in the downward direction, said upper tapered surface being shorter in axial length than an axial length of said lower tapered surface, lubricant being retained at each of the upper and lower radial bearings with gas being filled in said air separating gap thereby separating the lubricant of the upper radial bearing from the lubricant in the lower radial bearings, a meniscus on the surface of the lubricant in the upper radial bearing exposed to said air separating gap being moveable from said upper tapered surface into the upper radial bearing in response to rotation of the rotor about the shaft thereby exposing the dynamic pressure generating grooves in the upper radial bearing thereby suppressing further movement of the meniscus.

32. The hydrodynamic bearing device as set forth in claim 31, wherein said upper tapered surface has an axial length relative to the shaft shorter than a radial length thereof.

33. The hydrodynamic bearing device as set forth in claim 32, wherein said axial length of said upper tapered surface is shorter than an axial length of said lower tapered surface.

34. The hydrodynamic bearing device as set forth in claim 33, wherein said lower tapered surface has an axial length long than a radial length of said lower tapered surface.

* * * * *